United States Patent
Golovoy et al.

Patent Number: 5,954,246
Date of Patent: Sep. 21, 1999

[54] AUTOMOTIVE SPARE TIRE STORAGE SYSTEM

[75] Inventors: Angela Renee Golovoy, Royal Oak; Edgar George Trudeau, Bloomfield Hills; Mark Paoletti, Washington, all of Mich.

[73] Assignee: Ford Motor Company, Dearborn, Mich.

[21] Appl. No.: 09/009,352

[22] Filed: Jan. 20, 1998

[51] Int. Cl.[6] .................................................. B62D 43/04
[52] U.S. Cl. .................................. 224/42.23; 224/42.21; 224/42.24; 414/463
[58] Field of Search ............................ 224/42.23, 42.21, 224/42.24; 414/463, 466

[56] References Cited

U.S. PATENT DOCUMENTS

| | | |
|---|---|---|
| 2,449,544 | 9/1948 | Ballard .................................. 224/42.23 |
| 2,788,239 | 4/1957 | Francesco . |
| 3,460,695 | 8/1969 | Steele .................................... 224/42.23 |
| 3,559,829 | 2/1971 | Shamel . |
| 3,610,678 | 10/1971 | Brokaw . |
| 3,613,971 | 10/1971 | Betz . |
| 3,883,018 | 5/1975 | Hoisington .......................... 224/42.21 |
| 4,047,629 | 9/1977 | Klein .................................... 224/42.21 |
| 4,278,191 | 7/1981 | Mecham ............................... 224/42.23 |
| 4,434,919 | 3/1984 | Flowers . |
| 4,492,506 | 1/1985 | Hoagland et al. ................... 224/42.23 |

Primary Examiner—Linda J. Sholl
Attorney, Agent, or Firm—Steven A. Maynard

[57] ABSTRACT

A spare tire storage system for an automotive vehicle includes a swing arm having a first end rotatably attached to a first portion of a vehicle undercarriage and a second end detachably engagable to a second portion of a vehicle undercarriage, the swing arm rotatable in a vertical and horizontal plane when in a disengaged state, and a tire attached to the second end of the swing arm.

9 Claims, 2 Drawing Sheets

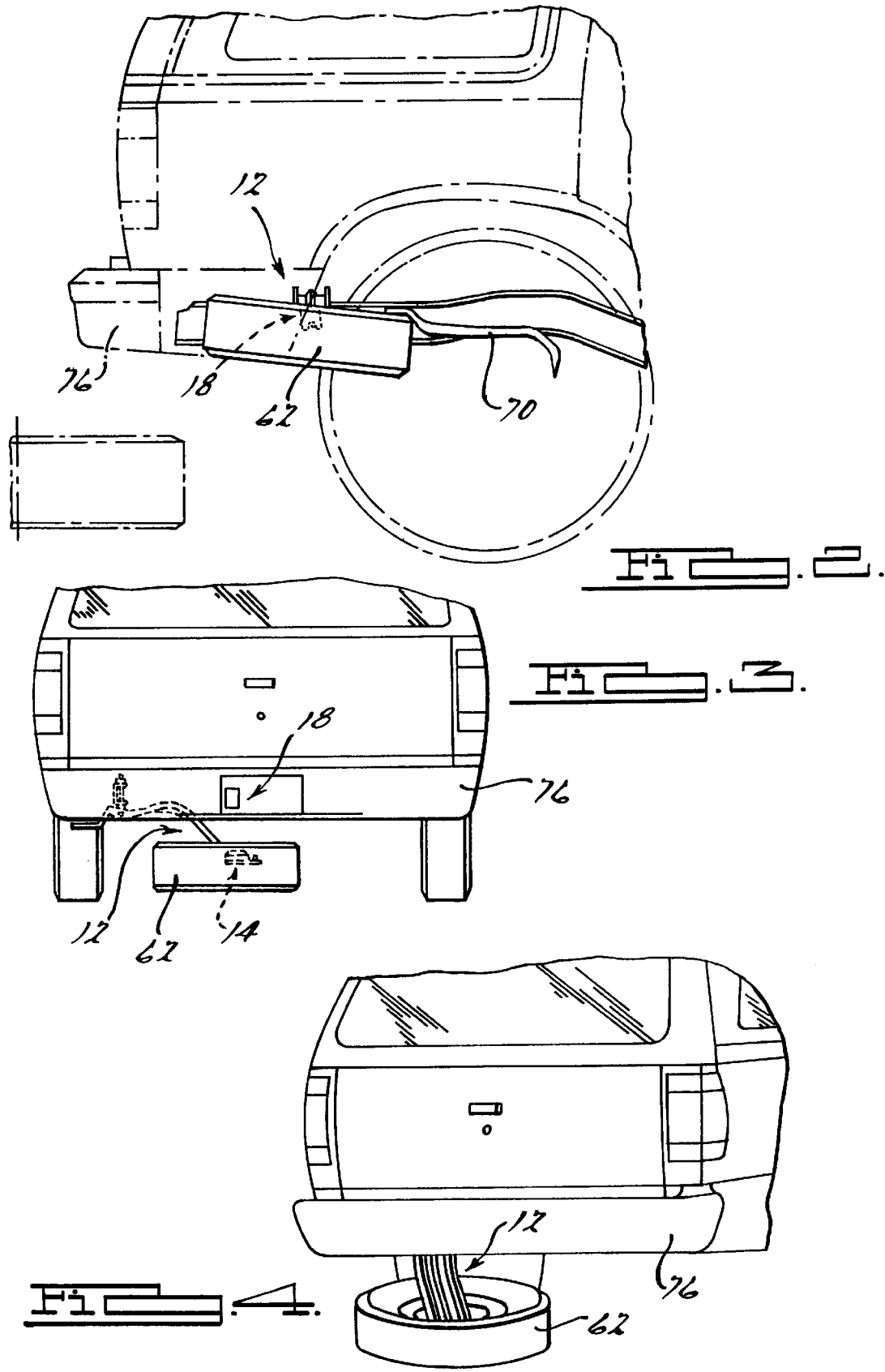

AUTOMOTIVE SPARE TIRE STORAGE SYSTEM

FIELD OF THE INVENTION

The present invention relates to storage systems, and more specifically, to an automotive spare tire storage system.

BACKGROUND OF THE INVENTION

Conventionally, the spare tire of an automotive vehicle is placed on the floor of the trunk usually to one side or on a shelf at the rear of the trunk formed to accommodate the gas tank. With the rise in popularity of sport utility vehicles (SUVs) in recent years, placement of the spare tire poses particular problems for vehicle designers since an SUV has storage space in the rear of the cabin instead of the traditional automotive trunk. Placing the tire on the inside of the SUV cabin, in the rear storage area, monopolizes an undesirably large portion of available storage space. Placing the tire externally of the vehicle on a hinged carrier, the rotational axis of the tire perpendicular to the rear cargo door and parallel to a horizontal plane, makes accessing the vehicle from the rear door a cumbersome process.

A solution to this problems involves placing the spare tire underneath the rear storage area, externally of the vehicle, typically between the rear rails. One method of accomplishing this is by utilizing a crank and carrier system. The use of such a system typically requires utilization of a rod for actuating the crank mechanism. Manipulation of the crank causes the tire to be released from a stored position underneath the vehicle and lowered to the ground via a cable and carrier assembly. Once the tire contacts the ground, and enough slack is provided for in the cable, the carrier may be removed from the spare tire. The operator must then reach under the vehicle to pull the spare tire out from beneath the vehicle. Having to reach under the vehicle and drag a spare tire across the ground and out from underneath the vehicle is a cumbersome process. If the clearance between the rear bumper and the ground is diminished, which would happen if the flat tire is one of the rear tires, this cumbersome process is only exacerbated.

Accordingly, a need exists in the art for a spare tire storage system which overcomes the shortcomings associated with previous designs and which allows for easy access to the spare tire.

SUMMARY OF THE INVENTION

Responsive to the deficiencies in the prior art, the present invention provides a spare tire storage system for an automotive vehicle including a swing arm having a first end rotatably attached to a first portion of a vehicle undercarriage for rotation in a vertical plane and a second end detachably engagable to a second portion of a vehicle undercarriage and a tire attached to the second end of the swing arm.

According to a preferred embodiment of the present invention the swing arm of the spare tire storage system is rotatable in a horizontal plane when in a disengaged state.

According to a feature of the present invention the first end of the swing arm further includes a portion for receiving a lift iron for manual rotation of the swing arm in the vertical and horizontal planes.

An advantage of the present invention is that the present spare tire storage system allows for rotation of the tire in both vertical and horizontal planes which allows the tire to be positioned out from underneath the vehicle for easy access thereto.

BRIEF DESCRIPTION OF THE DRAWINGS

Other features and advantages of the present invention will become apparent to those skilled in the spare tire storage related arts upon reading the following description with reference to the accompanying drawings, in which:

FIG. 2 is a side cut-away view of a vehicle having a spare tire storage system in an engaged state according to the present invention;

FIG. 3 is a rear cut-away view of a vehicle having a spare tire storage system in a disengaged state according to the present invention; and FIG. 4 is a perspective cut-away view of a vehicle having a spare tire storage system in a disengaged and horizontally rotated state according to the present invention.

DETAILED DESCRIPTION OF THE PREFERRED EMBODIMENT

Figure 1:
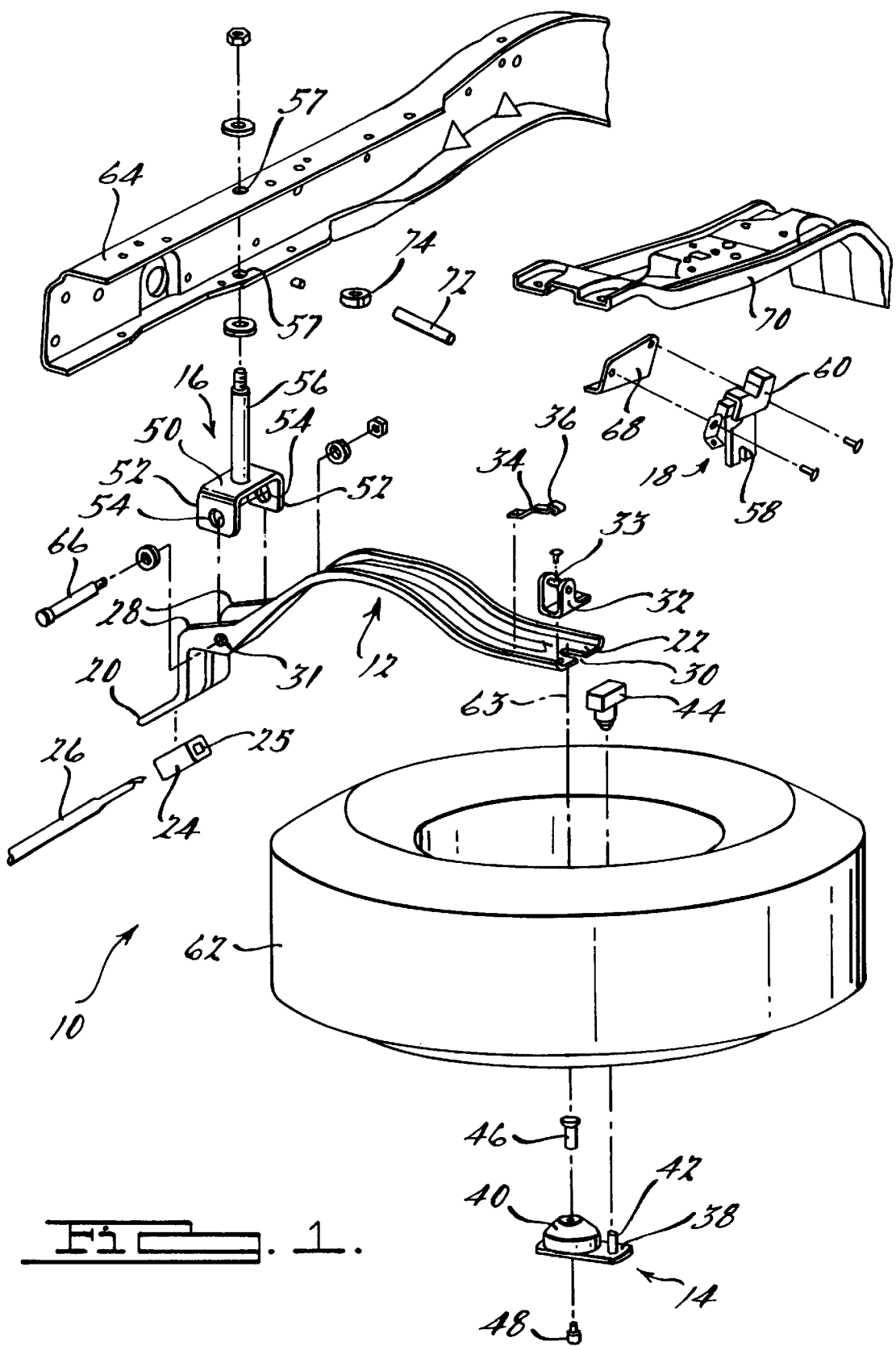
FIG. 1 is an exploded view of a spare tire storage system according to the present invention.

Turning now to the drawings, and in particular to FIG. 1, an exploded view of an automotive vehicle spare tire storage system 10 is shown. The storage system 10 includes a swing arm 12, a tire clamp bracket 14, a c-bracket assembly 16, and a latch mechanism 18.

The swing arm 12 of FIG. 1 is preferably an arcuate shaped member having a first end 20 and a second end 22. Disposed at the first end 20 is a receiving portion 24 having a hole 25 which is adapted to receive a lift iron 26. Proximate the first end 20 are laterally spaced parallel flange portions 28 having bolt receiving holes 31 located therethrough. The second end 22 has an open ended slot 30. Pivotally attached at the second end 22 is a striker bracket 32. The striker bracket 32 is movable from a first position, allowing access to the slot 30, and a second position where the open end of the slot 30 is closed via the striker bracket 32. The striker bracket 32 has a striker portion 33. A leaf spring 34 is attached to the second end 22 of the swing arm 12. The striker bracket 32 has a groove (not shown) which receives a spring latch portion 36 of the leaf spring 34 to maintain the striker bracket 32 in the second position.

The tire clamp bracket 14 has a planar base 38 with a wheel bore post 40 and a bolt hole post 42 projecting perpendicularly therefrom. A tie down nut 44 is adapted to fixedly receive the bolt hole post 42. A pivot knob 46 is attached to the wheel bore post 40 with a conventional fastener 48.

The c-bracket assembly 16 has a base 50 with a pair of laterally spaced parallel flanges 52 projecting perpendicularly therefrom, with bolt receiving holes 54 projecting therethrough. Also projecting from the base 50, opposite the flanges 52, is a mounting post 56.

The latch mechanism 18 has a striker receiving slot 58 and a conventional latch actuating device 60.

In assembly, the mounting post 56 of the c-clamp bracket 16 is guided through bolt holes 57 in a vehicle undercarriage, such as a rear rail 64, and attached thereto in conventional fashion to allow for rotation about the axis of the mounting post 56. The bolt receiving holes 54 of the flanges 52 are aligned with the bolt receiving holes 31 of flange portions 28, and a shoulder screw 66 is guided therethrough and conventionally fastened to allow for rotation about the axis of the shoulder screw 66. The latch mechanism 18 is rigidly attached to a portion of the vehicle undercarriage, such as a weld bracket 68. The wheel bore post 40 and the bolt hole post 42 of the tire clamp bracket 14 are guided through a respective central wheel bore and annular bolt hole (not shown) of a tire 62. The tire clamp bracket 14 is rigidly attached to the tire 62 with the tie down nut 44. With the striker bracket 32 in the first position, the pivot knob 46 of the tire clamp bracket 14 is guided into the slot 30 of the swing arm 12. The striker bracket 32 is pivoted to the second position, thereby closing the open end of the slot 30, until the striker bracket 32 engages the spring latch portion 36 of the leaf spring 34 thereby holding the striker bracket 32 in the second position. The pivot knob 46, held in the slot 30 by the striker bracket 32, allows the tire 62 to move in an axially free manor. In other words, when the swing arm 12 is used to elevate the tire 62 off the ground, the rotational axis 63 of the tire 62 maintains perpendicularity with respect to a horizontal plane until the tire 62 is brought in to contact with the vehicle undercarriage. The swing arm 12 is rotated about the shoulder screw 66, in a vertical plane, to an engaged state, as shown in FIG. 2, where the striker portion 33 of the striker bracket 32 engages the latch mechanism 18 via the striker receiving slot 58. Preferably for packaging reasons and as shown in FIG. 2, the tire 62 is at an angle, with respect to a horizontal plane, when the swing arm 12 is in the engaged state. More specifically and as shown in FIG. 2 as viewed from the side of the vehicle, the forward most part of the tire 62 is closest to the ground. This is preferably accomplished by bringing the forward most upper portion of the tire 62 in to contact with a portion of the vehicle undercarriage 70. Finally if so desired, a coil spring 72 may be employed to provide smooth transitionary swing arm 12 movement in the vertical plane. A spring retainer 74 may be employed to mount one end of the spring about the mounting post 56 of the c-bracket assembly 16 and the other end may be attached in conventional fashion at a predetermined point along the swing arm 12.

In use, a latch actuator button (not shown) is pressed to disengage the striker portion 33 of the striker bracket 32 from the latch mechanism 18. The swing arm 12, which rotates about the axis of the shoulder screw 66 in a vertical plane, is thereby free to move from the engaged state where the striker portion 33 is held in the slot 58 of the latch mechanism 18, to a disengaged state where the striker portion 33 is released from the latch mechanism 18 as shown in FIG. 3. Once the tire 62 has cleared the undercarriage 70 the pivot knob 46 of the tire clamp bracket 14 allows the rotational axis of the tire 62 to maintain perpendicularity with the horizontal plane. This is advantageous because the tire 62 will always be parallel to the ground thereby providing maximum clearance between the tire and the rear bumper 76 of the vehicle, as well as minimum carrying stress on the swing arm 12. With the assistance of the coil spring 72 the tire is gradually lowered, via the swing arm 12, to a position where the tire 62 is just above the ground, as shown in FIG. 3. The swing arm 12 is then rotated about the axis of the mounting post 56, in a horizontal plane, to bring the tire 62 substantially clear of the rear bumper 76, as shown in FIG. 4. The leaf spring 34 is depressed to clear the spring latch portion 36 from the groove of the striker bracket 32. The striker bracket 32 is pivoted to the first position thereby clearing the open end of the slot 30. The tire 62 is removed from the swing arm 12 by sliding the pivot knob 46 out of the slot 30. When the tie down nut 44 is unscrewed, the tire 62 may be utilized. To replace a tire 62 the aforementioned steps are practiced in reverse with the addition of placing the lift iron 26 in the hole 25 of the receiving portion 24 and rotating the swing arm 12 in the vertical plane until the striker 33 engages the latch mechanism 18. If so desired, the lift iron 26 may also be used to rotate the swing arm 12 in the horizontal plane via the hole 25 in the receiving portion 24.

Only one embodiment of an automotive vehicle spare tire storage system of the present invention has been described. Those skilled in the spare tire storage system related arts will appreciate that others may be possible without departing from the scope of the following claims.

We claim:

1. A spare tire storage system for an automotive vehicle comprising:

a swing arm having a first end rotatably attached to a first portion of a vehicle undercarriage for rotation in a vertical plane and a second end detachably engagable to a second portion of a vehicle undercarriage;

a tire attached to the second end of the swing arm;

a tire clamp bracket for carrying the tire, the bracket having a pivot knob; and wherein the second end has a slot for receiving the pivot knob so as to provide for pivotal movement of the tire upon the swing arm.

2. A spare tire storage system according to claim 1, wherein the swing arm is rotatable in a horizontal plane when in a disengaged state.

3. A spare tire storage system according to claim 1, wherein the first portion of a vehicle undercarriage is a rear rail.

4. A spare tire storage system according to claim 2, wherein the first end further includes a receiving portion adapted to receive a lift iron for manual rotation of the swing arm in the vertical and horizontal planes.

5. A spare tire storage system according to claim 1, wherein the second end further includes a striker adapted to engage a latch mechanism attached to the second portion of a vehicle undercarriage for maintaining the swing arm in an engaged state.

6. A spare tire storage system for an automotive vehicle comprising:

an swing arm having a first end rotatably attached to a first portion of a vehicle undercarriage and a second end detachably engagable to a second portion of a vehicle undercarriage, the swing arm rotatable in a vertical plane and a horizontal plane with in a disengaged state;

a tire pivotally attached to the second end of the swing arm;

a tire clamp bracket for carrying the tire, the bracket having a pivot knob; and wherein the second end has a slot for receiving the pivot knob so as to provide for pivotal movement of the tire upon the swing arm.

7. A spare tire storage system according to claim 6, wherein the first portion of a vehicle undercarriage is a rear rail.

8. A spare tire storage system according to claim 6, wherein the first end further includes a receiving portion adapted to receive a lift iron for manual rotation of the swing arm in the vertical and horizontal planes.

9. A spare tire storage system according to claim 6, wherein the second end further includes a striker adapted to engage a latch mechanism attached to the second portion of a vehicle undercarriage for maintaining the swing arm in an engaged state.

* * * * *